3,334,970
Patented Aug. 8, 1967

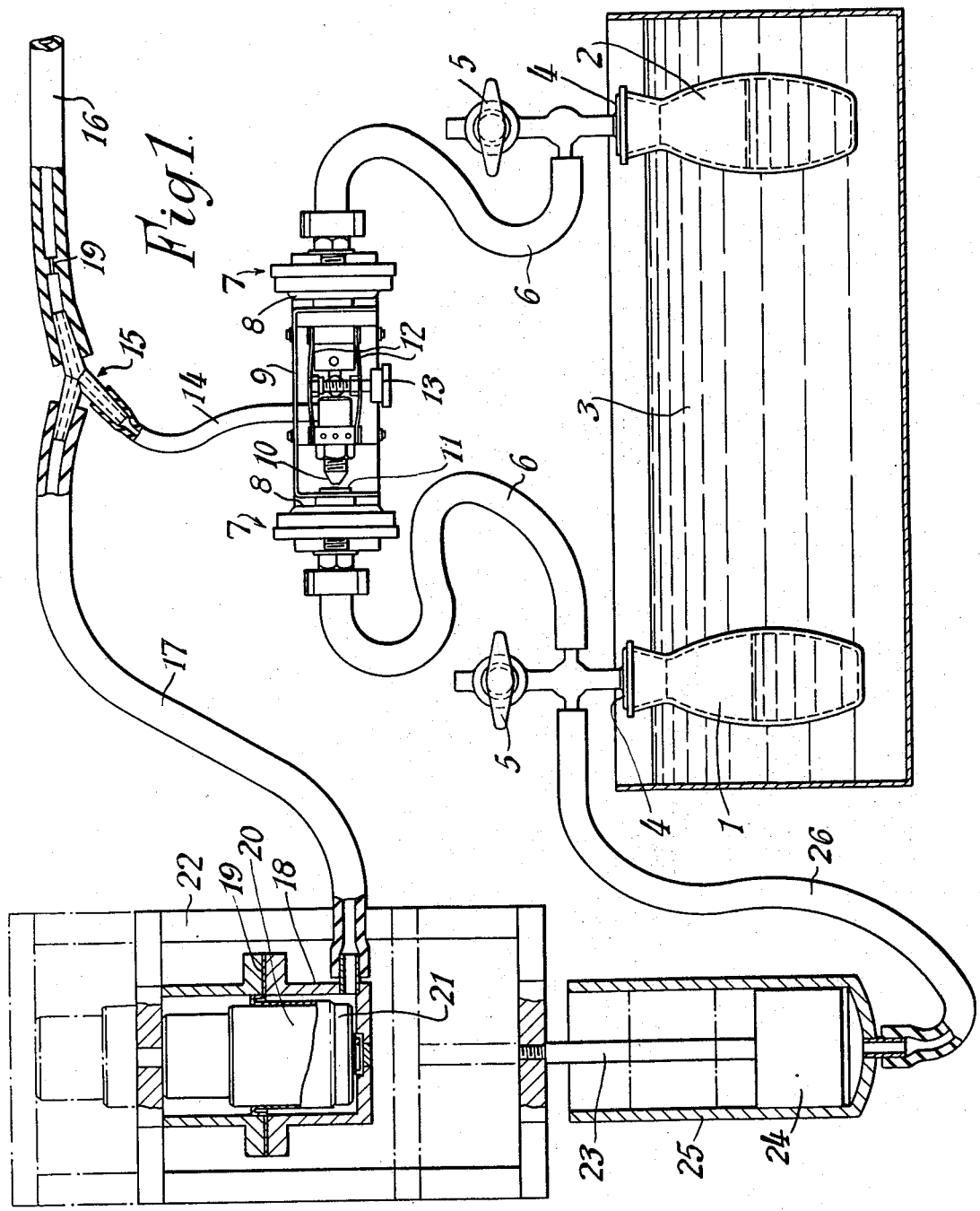

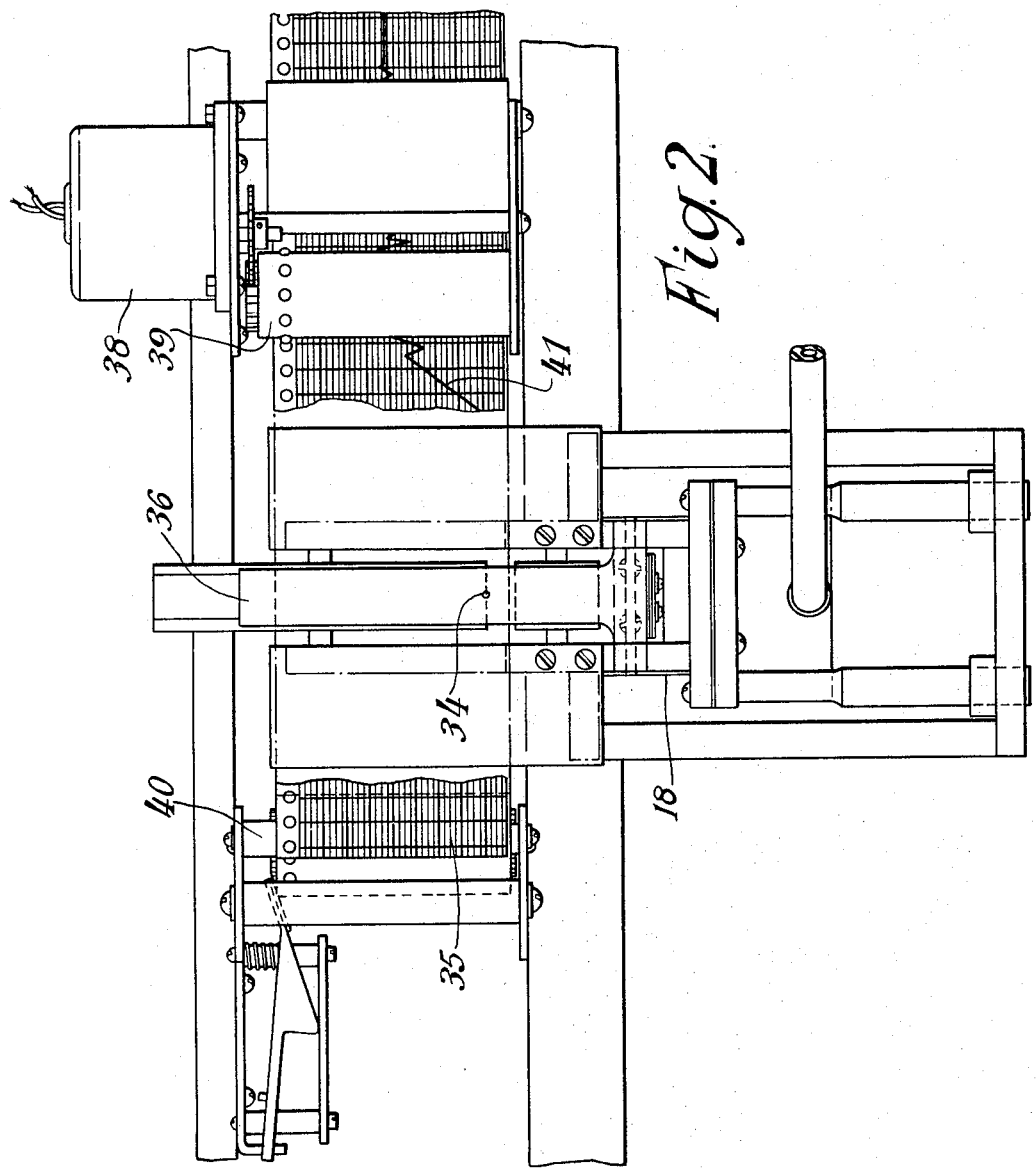

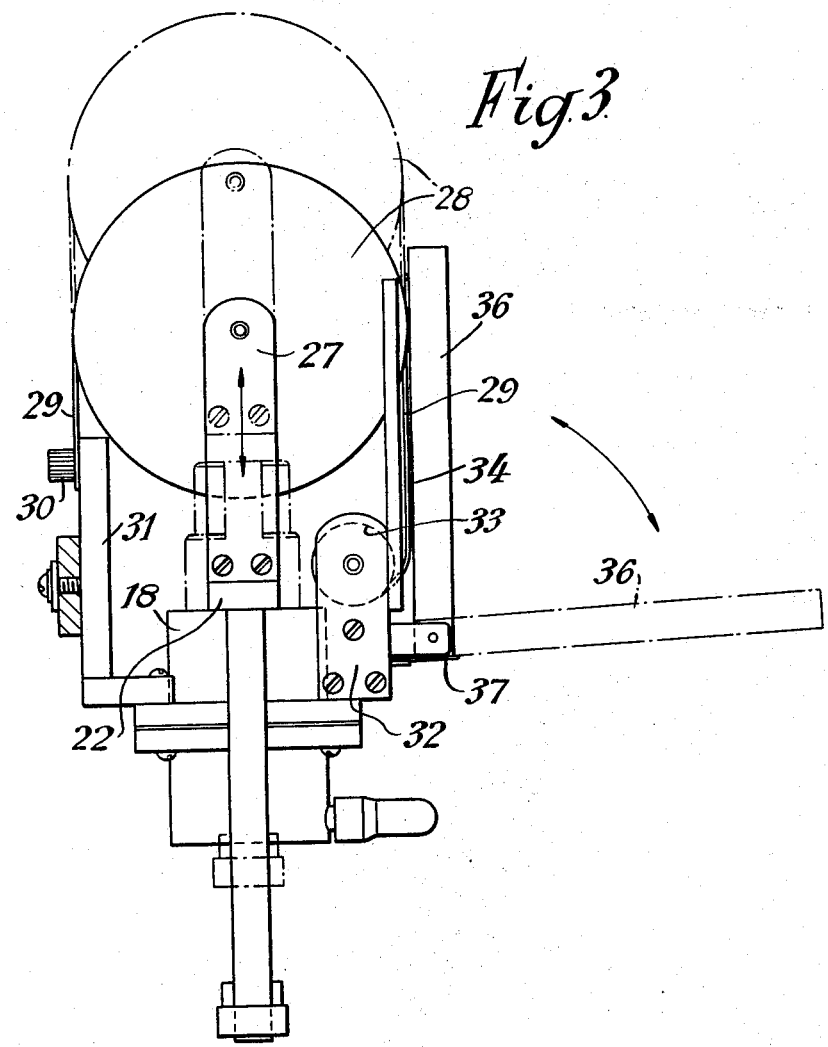

1

3,334,970
PATHOLOGICAL GAS MEASURING APPARATUS
Norman A. de Bruyne, Cambridge, England, assignor to Techne (Cambridge) Limited, Cambridge, England
Filed Aug. 31, 1964, Ser. No. 393,186
Claims priority, application Great Britain, Aug. 29, 1963, 34,238/63
7 Claims. (Cl. 23—254)

ABSTRACT OF THE DISCLOSURE

The invention provides an apparatus for measuring and recording the amount of gas evolved or absorbed in a chemical reaction under varying conditions while simultaneously compensating for changes in gas volume due to changes in temperature and barometric pressure.

This invention relates to apparatus used in routine pathological work in hospitals and the like for measuring the quantity of gas evolved or absorbed by a specimen under various reactions, the invention being primarily concerned with the usual apparatus employed in carrying out the methods called "Manometric" or "Gasometric" tests, such apparatus including a reaction vessel in which the respiratory tissue, cell suspension or other specimen is placed, a compensation vessel connected with the reaction vessel by a manometer tube which indicates any difference in pressure between the two vessels when the two vessels are immersed in a water bath, the reaction vessel having a connection leading to a second manometer associated with a tube accurately graduated in hundredths of a cubic centimeter by which readings are obtained showing the quantity of gas evolved during the test.

This particular apparatus although excellent in operation for measuring the total volume of gas absorbed or evolved by a particular reaction is not very well adapted for measurements of cell respiration or for measuring rates of reactions or when several comparative measurements have to be made side by side. For these reasons this apparatus has been little used for work on respiration.

The chief object of the invention is to effect improvements in the general type of apparatus hereinbefore referred to which will enable an autographic record of volumes plotted against time to be obtained.

The apparatus according to the present invention includes a reaction vessel for containing the specimen under test, a pressure compensating vessel, means for maintaining both vessels at the same temperature, a cylinder connected with the reaction vessel and containing a piston axially displaceable with the cylinder to maintain a uniform pressure in the reaction vessel, a servo-cylinder adapted for connection with a source of air pressure supply and containing a piston linked to the first piston to move the latter axially within its associated cylinder, a jet or other small orifice adapted for connection with the source of air pressure supply and means responsive to variation in pressure in either vessel to open or close said jet or orifice to produce a variation in air pressure on the servo-piston to displace the first piston within its associated cylinder to maintain a constant pressure in the reaction vessel and means for giving a visual indication of

2 a change in volume in the reaction vessel to indicate the quantity of gas evolved or absorbed by the specimen over a period of time.

The two vessels are immersed in a water bath as previously and although it is preferred to employ a pressure in the air system higher than atmospheric this pressure may be sub-atmospheric if desired.

The invention will now be described as applied to an apparatus including a controlling air circuit in which the pressure is above atmospheric.

Referring to the accompanying drawings:
FIGURE 1 is a part section, part elevation showing the component parts of the apparatus diagrammatically;
FIGURES 2 and 3 are respectively a front elevation and side elevation of the mechanism used to attain a graphical record of tests made with the apparatus.

The apparatus includes vessels 1 and 2 which conveniently take the form of closely stoppered flasks which may contain a suitable liquid, vessel 1 being intended to contain the respiratory tissue, cell suspension or other matter to be tested and being therefore referred to as the reaction vessel, vessel 2 being a compensation vessel and being intended to maintain the pressure in the vessel 1 constant throughout the test.

The two vessels are preferably submerged in a waterbath 3 the temperature of which is maintained constant throughout the test.

Both vessels are fitted with closely fitting stoppers 4 and with manually openable and closable valves 5. Flexible tubes 6 lead from the two vessels to fixed capsules 7 each including a rubber or other flexible diaphragm 8 which will be flexed as a result of a variation in pressure in its associated vessel. The two diaphragms are rigidly interconnected by means of a yoke 9 for simultaneous movement.

Mounted within the yoke but occupying a fixed position is a jet 10 which co-operates with an oppositely positioned plane surface 11 associated with the yoke so that movement of the diaphragms and yoke will open or close the orifice in the jet, the yoke constituting a flapper.

The gap between the jet 10 and the plane surface 11 is preferably adjustable, the jet being supported between the free ends of a pair of blade springs 12 the opposite ends of the blade springs being fixed, the blade springs being bowed to a greater or less extent to decrease or increase their effective length by a finger operated adjusting screw 13.

A flexible tube 14 is attached to a connection leading to the jet 10, the opposite end of the tube being connected to a branch of a Y junction piece 15 a second branch of which is connected with a flexible tube 16 connected with a source of air pressure supply.

The third branch of the Y piece 15 is connected by way of a flexible tube 17 with a fixed cylinder 18, the flow of air to the cylinder 18 and also to the jet 10 being restricted by a restriction 19 in the flexible tube 16.

The cylinder 18 is constructed as two co-axially arranged parts which together clamp the periphery of a flexible diaphragm 19 the central part of which is plunged to accommodate the lower part of a servo-piston 20, the diaphragm 19 being clamped at its centre between the servo-piston 20 and a clamping disc 21 secured to the piston by one or more securing screws. Such a construction of diaphragm maintains an efficient seal against loss of air from the cylinder and permits of axial movement of the piston relative to the cylinder from the full line to the chain dotted line position without friction between the servo-piston and cylinder.

The servo-piston is secured at its upper end to a rectangular frame 22, the frame being connected at its lower end to a piston rod 23 carrying a piston 24 slidable in a cylinder 25 connected by a flexible tube 26 with the vessel 1.

The servo-piston 20 actuates a pen or other marking device for plotting a graph on a calibrated chart to give a permanent record of the test, the graph plotting mechanism being shown in FIGURES 2 and 3.

The frame 22 carries a bifurcated carrier 27 in which is revolvably mounted a large diameter drum 28 over which is passed a tensator type spring 29 one end of which is anchored at 30 to a bracket 31 secured to the cylinder 18, the cylinder carrying a second bracket 32 which in turn carries a small diameter drum 33 around which is coiled the opposite end of the spring 29.

The spring 29 carries a marker in the form of a small protuberance or ball 34 which makes point contact with the rear face of a calibrated chart 35 (see FIGURE 2) the chart being sandwiched between the extremity of the protuberance 34 and a hinged transparent cover member 36 urged into its operative position by a blade spring 37, the calibrated chart being treated in known manner so that engagement of the protuberance with the rear face of the moving chart will produce a visible trace on its front face.

The calibrated chart is perforated at one edge and is fed forwardly at a constant speed by an electric motor 38 driving a sprocket roller 39, the chart being drawn from a roll and passing over a tensioning sprocket roller 40.

It will be appreciated therefore that the graph or trace 41 on the chart will be produced as a result of endwise movement of the chart and movement of the protuberance 34 transversely of the chart, in turn due to winding or unwinding of the tape 29 onto or from the small diameter drum 33 as a result of movement of the large diameter drum 28 in the direction of the arrows in FIGURE 3 consequent upon movement of the servo piston 20.

The cylinder 25 and piston 24 may be the component parts of a hypodermic syringe.

It will be appreciated that any variation in pressure in the compensating vessel 2 will result in flexure of its associated diaphragm 8 which through the medium of the second diaphragm 8 on the left and plane surface 11 will open or close the jet orifice to vary the pressure of air on the servo-piston 20.

If the barometric pressure or the temperature of the waterbath 3 should change whilst the test is being made then the pressure in both vessels 1 and 2 will change. Assuming that the pressure rises in both vessels, then in the absence of the compensating vessel 2, this pressure rise would be compensated by the piston 24 and the result would be indicated on the chart as an increase in volume. The compensating vessel 2 counteracts this as the same increase in pressure in the compensating vessel will deflect its associated diaphragm and cause a corresponding deflection in the diaphragm 8 on the left associated with the reaction vessel 1, causing the plane surface 11 to move further away from the jet. This results in a reduction in pressure in the air system which in turn causes the servo-piston 20 to move in its cylinder and bring about a consequential movement of the second piston 24 to compensate for such increase in pressure which would otherwise have given a false reading.

Movement of the servo-piston 20 within its associated cylinder will therefore be strictly in accordance with changes of volume in the reaction vessel such variations in volume over a particular time being indicated by the graph or trace on the calibrated chart.

In this way changes of barometric pressure or temperature in either vessel will be compensated for so that any such variations will not result in an incorrect record.

I claim:

1. An apparatus especially useful for measuring the quantity of gas evolved or absorbed by a specimen under varying reacting conditions including a reaction vessel for containing the specimen under test, a pressure compensating vessel, means for maintaining both vessels at the same temperature, a cylinder connected with the reaction vessel and containing a piston axially displaceable with the cylinder to maintain a uniform pressure in the reaction vessel, a servo-cylinder adapted for connection with a source of air pressure supply and containing a piston linked to the first piston to move the latter axially within its associated cylinder, means comprising a small orifice to provide a jet adapted for connection with the source of air pressure supply and means responsive to variation in pressure in either of said vessels to open or close said orifice to produce a variation in air pressure on the servo-piston to displace the first piston within its associated cylinder to maintain a constant pressure in the reaction vessel and means for giving a visual indication of a change in volume in the reaction vessel to indicate the quantity of gas evolved or absorbed by the specimen over a period of time.

2. Apparatus especially useful for measuring the quantity of gas evolved or absorbed by a specimen under varying reacting conditions including a reaction vessel for the specimen being tested and a compensating vessel, means for maintaining both vessels at the same temperature, the two vessels being each connected with a hollow capsule including a flexible diaphragm flexed as a result of a variation in internal pressure of its associated vessel, means linking the two diaphragms together, air pressure supply means, means including a small orifice to provide a jet connected to said air pressure supply means, means mounting said jet on said means linking the two diaphragms so that the means connecting the two diaphragms can move with respect to the jet means, said means for linking the two diaphragms together including a flapper-like means for closing and opening the orifice of said jet when the diaphragm linking means moves with respect to said jet means as a result of differential pressure on the two diaphragms, a servo-piston and cylinder in connection with said source of air pressure, the piston being axially displaceable as a result of variations in pressure in the pressure circuit consequent upon opening or closing of the jet orifice, a cylinder connected to the reaction vessel containing a piston displaceable within the cylinder under movements of the servo-piston to maintain a uniform pressure in the reaction vessel and means operable by the servo-piston for giving a visual indication of a change in volume in the reaction vessel to indicate the quantity of gas evolved or absorbed by the specimen in the reaction vessel.

3. Apparatus as claimed in claim 1 including indicating means in the form of a calibrated chart and means associated with said servo-piston to trace upon said chart, a trace proportional to the axial movement of the servo-piston.

4. Apparatus as claimed in claim 3 said tracing means associated with said servo-piston including a tensator spring carrying a protuberance engaging the rear surface of said calibrated chart and movable transversely of the chart as a result of linear movement of the spring, means for moving the calibrated chart with respect to said tensator spring, said chart being specially treated to reproduce the trace of the protuberance on the front face thereof.

5. Apparatus as claimed in claim 1 wherein the means responsive to variation in pressure in the reaction and compensating vessels comprises a pair of hollow fixed capsules one for each of said vessels and each fitted with a flexible diaphragm, rigid yoke means connecting the two diaphragms, and yoke being movably mounted on said jet forming means whereby said yoke forms a flapper which moves to open and close the jet orifice.

6. Apparatus as claimed in claim 2 wherein the air pressure supply means comprising a Y type tubular connecting piece, a first branch of the Y-tube being connected to the jet providing means, the second branch being connected with the source of air pressure supply through a restriction, the third branch being connected with the servo-cylinder.

7. Apparatus as claimed in claim 6, wherein the jet providing means is carried by the free ends of a pair of spaced blade springs, the springs being fixed at their opposite ends, an adjusting screw for said springs by means of which they can be bowed to a greater or less extent to vary their effective length and increase or decrease the distance separating the jet from the flapper.

References Cited
UNITED STATES PATENTS

| | | | |
|---|---|---|---|
| 1,390,488 | 9/1921 | Boulton | 23—254 |
| 2,147,969 | 2/1939 | Dowling | 23—254 |

FOREIGN PATENTS

| | | |
|---|---|---|
| 1,145,815 | 3/1963 | Germany. |

JAMES J. GILL, *Acting Primary Examiner.*

RICHARD C. QUEISSER, *Examiner.*

E. D. GILHOOLY, *Assistant Examiner.*